United States Patent [19]

Hobart et al.

[11] Patent Number: 5,052,017

[45] Date of Patent: * Sep. 24, 1991

[54] HIGH POWER LASER WITH FOCUSING MIRROR SETS

[75] Inventors: James L. Hobart, Los Altos Hills; Michael W. Sasnett, Los Altos; Wayne S. Mefferd, Los Altos Hills, all of Calif.; Peter N. Allen, Sturbridge, Mass.

[73] Assignee: Coherent, Inc., Palo Alto, Calif.

[*] Notice: The portion of the term of this patent subsequent to Jun. 11, 2008 has been disclaimed.

[21] Appl. No.: 535,185

[22] Filed: Jun. 8, 1990

Related U.S. Application Data

[63] Continuation of Ser. No. 278,665, Dec. 1, 1988, Pat. No. 5,023,886.

[51] Int. Cl.⁵ .............................................. H01S 3/08
[52] U.S. Cl. ...................................... 372/99; 372/93; 372/105; 372/108
[58] Field of Search ...................... 372/61, 92, 99, 105, 372/107, 98, 93, 108, 33, 58

[56] References Cited

U.S. PATENT DOCUMENTS

| | | | |
|---|---|---|---|
| 4,486,887 | 12/1984 | Hoag et al. | 372/58 |
| 4,491,950 | 1/1985 | Hoffmann | 372/95 |
| 4,660,209 | 4/1987 | Osada et al. | 372/58 |
| 4,709,372 | 11/1987 | Rando et al. | 372/58 |

Primary Examiner—Leon Scott, Jr.
Attorney, Agent, or Firm—Limbach, Limbach & Sutton

[57] ABSTRACT

A laser system employing one or more mirror sets having substantially astigmatism-free focusing power sufficient to maintain a desired laser beam diameter, for example, to compensate for thermally-induced distributed lensing. In one class of preferred embodiments, the invention is a high power gas laser system having a folded optical cavity with a periodic intracavity refocusing means to compensate for distributed negative thermal lensing in the hot plasma that comprises the active medium, and thus maintain a substantially constant beam diameter throughout the optical cavity. The periodic intracavity refocusing means preferably includes a corner mirror set (including at least one curved mirror and at least one other mirror) at each corner of the folded optical cavity. In one preferred embodiment, each corner mirror set is a mirror pair including a spherical mirror and cylindrical mirror. In another preferred embodiment, each corner mirror set comprises three mirrors (including three spherical mirrors, or two spherical mirrors and a planar mirror). In another class of preferred embodiments, the inventive focusing mirror sets are not included within the optical cavity of a high power laser, but instead, one or more such focusing mirror sets are included within the output beam delivery optical components of a high power laser. For example, one of the inventive focusing mirror sets may replace a conventional lens to direct the output beam of a high power laser system along a desired path and maintain a desired beam diameter.

19 Claims, 3 Drawing Sheets

HIGH POWER LASER WITH FOCUSING MIRROR SETS

This is a continuation application of copending application Ser. No. 07/278,665 and now U.S. Pat. No. 5,023,886, filed Dec. 1, 1988.

FIELD OF THE INVENTION

The invention is a high power laser system including one or more focusing mirror sets, for compensating for the optical effects of distributed thermal negative lensing in a laser optical cavity, and for maintaining desired beam diameter.

BACKGROUND OF THE INVENTION

Distributed thermal negative lensing in high power gas lasers, due to hot gas (or plasma) in laser optical cavities, is a well known phenomenon. As the active length of a sealed-off (or slow flow) $CO_2$ laser is increased above six to eight meters, the negative lensing effect, caused by the radial temperature gradient and hence the density gradient in the mixture of gases serving as the active medium, cannot be neglected. This causes the laser beam diameter to become larger than would be expected without such negative lensing. Negative thermal lensing also occurs in high power gas lasers other than high power $CO_2$ lasers.

Throughout this specification, the phrase "high power" laser system will denote a laser system producing a laser beam having power greater than 200 watts. In a slow-flow $CO_2$ laser, it would be desirable to increase the optical cavity's length to increase the output beam power above 750 watts (to as much as 1.6 kW or more). However, the negative thermal lensing phenomenon limits the efficiency and maximum output power of conventional slow-flow $CO_2$ laser systems.

The negative lensing phenomenon in high power $CO_2$ laser systems can sometimes be ignored in the special case that smooth-bore plasma tubes are employed in the optical cavities of such lasers. Such smooth-bore plasma tubes function as waveguides confining both fundamental and higher order modes with low propagation losses. However, it is often desirable to suppress such higher order modes.

For example, the high power, folded, carbon dioxide gas laser system of U.S. Pat. No. 4,500,996, issued on Feb. 19, 1985 to Sasnett et al. and assigned to Coherent, Inc. (the assignee of the present application), employs rippled plasma tubes (having periodic reduced diameter sections) in the system's folded optical cavity to suppress waveguiding. By employing rippled plasma tubes, the losses for the higher order modes become sufficiently large that these higher order modes do not lase. Thus, the output laser beam emerging from the system of U.S. Pat. No. 4,500,996 is substantially improved over the case in which non-rippled tubes are employed.

Normal diffraction causes the beam inside the optical cavity to change diameter throughout the length of the cavity. For $CO_2$ lasers longer than a few meters this makes it necessary to use rippled plasma tubes of differing diameters to confine the beam and the excited gas in the same volume, and thereby achieve full output power and efficiency from the laser. For slow-flow $CO_2$ lasers longer than 6 to 8 meters, the negative thermal lensing aggravates this problem of having different beam diameters at different locations along the optical cavity. It would be desirable to improve high power, folded cavity, fundamental mode gas laser systems (such as the system described in U.S. Pat. No. 4,500,996) so that the beam diameter is substantially constant along the entire length of the optical cavity, so that plasma tubes of equal diameter may be employed without reducing the system's output power and efficiency. It would also be desireable to be able to choose and control this beam diameter as part of the laser design rather than to have to accept the diameter dictated by end mirror curvature, diffraction and negative thermal lens effects.

In principle these goals could be achieved by providing periodic refocusing of the beam either with one or more lenses of positive focal length distributed throughout the optical cavity or by replacing conventional flat corner mirrors with off-axis parabolic mirrors to provide refocusing. In practice neither of these approaches is acceptable. The use of one or more lenses inside the optical cavity is precluded by the dependence of the focal length of the lens(es) on the power absorbed in the lens(es) and hence on the circulating power inside the cavity. The use of off-axis parabolic surfaces is precluded by their high cost.

SUMMARY OF THE INVENTION

The invention is a laser system employing one or more focusing mirror sets for counteracting distributed thermal negative lensing, and for maintaining desired beam diameter. In one class of preferred embodiments, the invention is a high power gas laser system having a folded optical cavity with a periodic intracavity refocusing means for reducing distributed thermal negative lensing, and thus maintaining a substantially constant beam diameter throughout the optical cavity. The periodic intracavity refocusing means preferably includes a corner mirror set (including at least one curved mirror and at least one other mirror) at each corner of the folded optical cavity.

In one preferred embodiment, each corner mirror set includes a spherical mirror and cylindrical mirror. In another preferred embodiment, each corner mirror set comprises three mirrors, including three spherical mirrors (or two spherical mirrors and a planar mirror). In each preferred embodiment, the curved mirrors are shaped and oriented so that each mirror set is substantially astigmatism-free.

In another class of preferred embodiments, the inventive focusing mirror sets are not included within the optical cavity of a high power laser. Rather, at least one such focusing mirror set is included with the output beam delivery optical components of the high power laser. For example, one of the inventive all-reflective focusing mirror sets may replace a conventional transmissive final focus lens to direct the output beam of a high power laser system along a desired path (for example, for welding or cutting a material).

Each mirror in each preferred embodiment of the inventive mirror set has an easy-to-generate (and hence inexpensive) surface, such as a spherical or cylindrical surface.

DETAILED DESCRIPTION OF THE PREFERRED EMBODIMENTS

Figure 1:
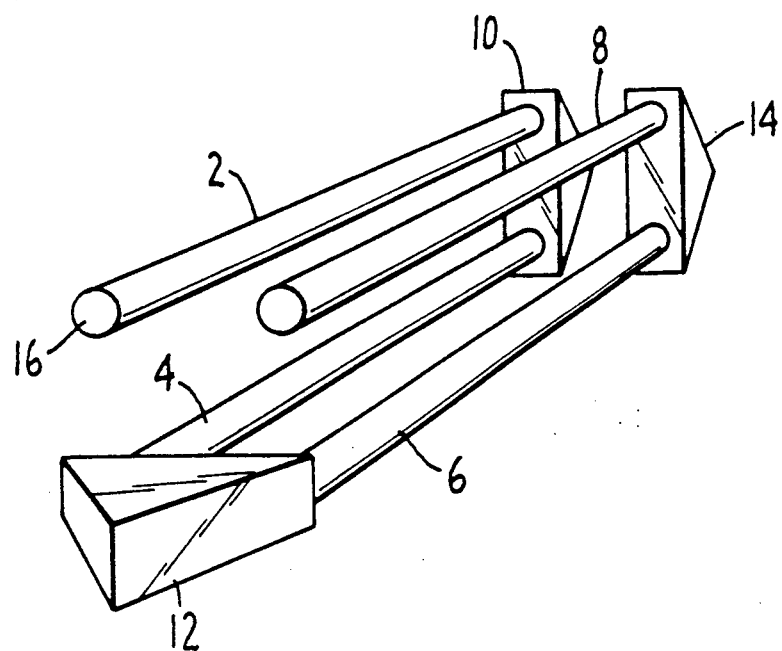
FIG. 1 is a simplified perspective view of a folded laser optical cavity embodying the invention, including four plasma tubes and three corner mirror sets, each set comprising two mirrors.

While a folded cavity gas laser may include any number of plasma tubes, the folded laser optical cavity of FIG. 1 includes four plasma tubes 2, 4, 6, and 8. Each of corner mirror housings 10, 12, and 14 provides an airtight seal for confining gaseous lasing medium 16 (which may include carbon dioxide or some other gas or mixture of gases) within the cavity. Each of housings 10, 12, and 14 also encloses a corner mirror set for reflecting laser radiation within the optical cavity between adjacent pairs of the plasma tubes. Each of tubes 2 and 8 may be connected to another corner mirror set, or may terminate at an optical cavity end mirror (not shown).

To generate laser radiation within the optical cavity, the gas within the cavity is excited in a conventional manner to the necessary energy level by a series of electrical discharges (not shown) distributed along the plasma tubes. Preferably, each of tubes 2, 4, 6, and 8 is rippled, to suppress propagation of higher order laser radiation modes and ensure that the laser beam emerging from the optical cavity will include substantially only fundamental mode laser radiation.

If conventional flat mirrors are used in the corner mirror sets, and the excited gas (or plasma) within the plasma tubes is sufficiently hot, the phenomena of diffraction and distributed thermal negative lensing will cause the laser beam diameter to vary along the beam path. The laser beam diameter within some of the plasma tubes will differ significantly from the beam diameter in others of the plasma tubes.

In contrast, each corner mirror set of the inventive system includes one or more curved mirrors whose combined effective focal length is selected to compensate for the distributed thermal negative lensing. The effective focal length of each corner mirror set provides compensation such that when, preferably, a number of corner mirror sets are positioned with appropriate spacing along the optical cavity, sufficient periodic refocussing is provided to maintain substantially constant laser beam diameter throughout the optical cavity's length. Such periodic intracavity refocussing maintains a substantially constant laser beam diameter within each plasma tube of the optical cavity, and thus allow use of identical diameter laser tubes 2, 4, 6, and 8. Several embodiments of the inventive corner mirror sets will be described below.

Figure 2:
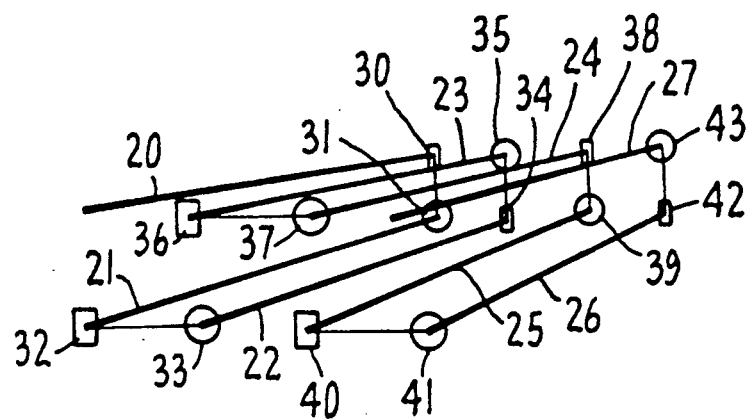
FIG. 2 is a simplified perspective view of a folded laser optical cavity embodying the invention, including eight plasma tubes and seven corner mirror pairs.

The folded laser optical cavity of FIG. 2 includes eight plasma tubes 20, 21, 22, 23, 24, 25, 26, and 27. Cylindrical mirrors 30, 32, 34, 36, 38, 40, and 42, and spherical mirrors 31, 33, 35, 37, 39, 41, and 43 direct the laser beam between adjacent pairs of plasma tubes. Mirrors 30–43 are grouped into seven corner mirror sets, each including a cylindrical mirror and a spherical mirror. For example, one such mirror set includes mirrors 30 and 31, and another includes mirrors 32 and 33. Each corner mirror set reflects laser radiation within the cavity between adjacent pairs of the plasma tubes, and each corner mirror set is preferably surrounded by an airtight housing (not shown in FIG. 2) such as housing 12 of FIG. 1, for confining a gaseous lasing medium within the optical cavity. In the FIG. 2 configuration, the beam's plane of incidence at consecutive corner mirror sets is alternatingly horizontal and vertical although the plane of incidence of the beam need not so alternate.

Figure 3:
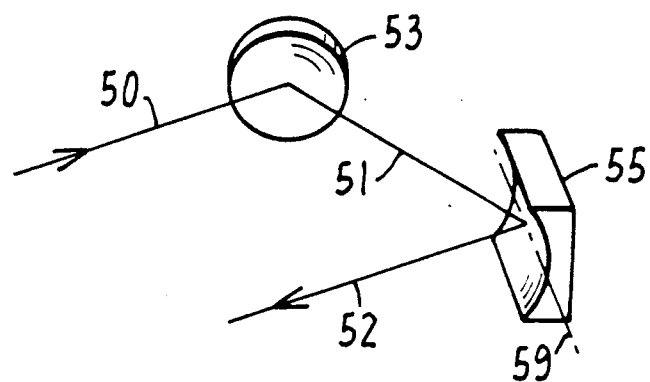
FIG. 3 is a perspective view of a corner mirror pair including a concave spherical mirror and a concave cylindrical mirror, of the type employed in a first embodiment of the invention.

FIG. 3 is a preferred embodiment of an inventive corner mirror set including two mirrors, concave spherical mirror 53 and concave cylindrical mirror 55. In FIG. 3, mirrors 53 and 55 are oriented so that incoming beam 50 is incident at a 45 degree angle on mirror 53, reflected beam 51 is incident at a 45 degree angle on mirror 55, twice reflected beam 52 propagates at a 90 degree angle with respect to reflected beam 51, and twice reflected beam 52 propagates in a direction rotated by 180 degrees (anti-parallel) with respect to beam 50's propagation direction.

The radii of curvature of mirrors 53 and 55 are chosen so that astigmatism introduced by reflection from spherical mirror 53 is cancelled by the astigmatism introduced by reflection from the cylindrical surface of mirror 55. In the case that mirror 55's cylinder axis 59 lies in the incidence plane of beam 51 (as shown in FIG. 3), the concave radius of curvature of spherical mirror 53 will preferably be substantially equal to that of concave cylindrical mirror 55. In this preferred embodiment, the effective focal length of the combination of mirrors 53 and 55 is substantially equal to $f = \sqrt{2}R/4$, where R is the radius of curvature of mirror 53 (or mirror 55).

By substituting corner mirror pairs, of the type shown in FIG. 3, for conventional flat mirror pairs in a slow-flow $CO_2$ laser having eight 1.5 meter plasma tubes, we found that the output beam power increased from about 800 watts to 950 watts. The quality ($M^2$) of the output beam also improved by decreasing from 3.4 to 2.6, where the parameter $M^2$ describing the laser output beam quality is defined as $M^2 = (\pi/4L)(\theta)(D)$, where L is the laser beam wavelength, $\theta$ is the full angle far-field beam divergence, and D is the laser beam waist diameter.

Figure 4:
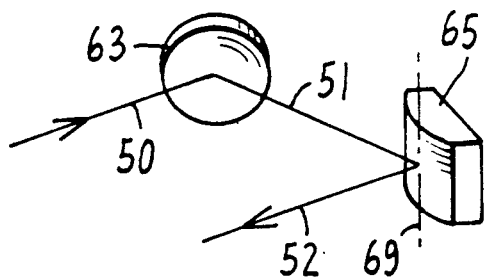
FIG. 4 is a perspective view of a corner mirror pair including a concave spherical mirror and a convex cylindrical mirror, of the type employed in a second embodiment of the invention.

An alternative preferred embodiment of the inventive corner mirror pair is shown in FIG. 4. The FIG. 4 mirror pair includes a concave spherical mirror (63) and a convex cylindrical mirror (65), as in the FIG. 3 embodiment. Axis 69 is the cylinder axis of mirror 65. The FIG. 4 mirror pair differs from the FIG. 3 pair in that the cylindrical mirror's cylinder axis 69 is perpendicular to the incidence plane of reflected beam 51 incident on mirror 65. In the FIG. 4 embodiment, the radius of curvature of spherical mirror 63 is preferably half in magnitude, and opposite in sign, to the radius of curvature of cylindrical mirror 65. In this preferred embodiment, the effective focal length of the combination of mirrors 63 and 65 is substantially equal to $f=\sqrt{2}R/2$, where R is the radius of curvature of mirror 63.

In yet another alternative embodiment, spherical mirror 53 in FIG. 3 is replaced by a cylindrical mirror having a cylinder axis perpendicular to the plane of beams 50, 51, and 52. In this embodiment, the radius of curvature of mirror 55 will preferable be half the radius of curvature of the cylindrical mirror replacing spherical mirror 53.

It should be appreciated that the inventive spherical-cylindrical mirror pair will be free of astigmatism only to the extent that the separation between the spherical mirror and cylindrical mirror is very short in relation to the effective focal length of the mirror pair.

In all embodiments of the inventive corner mirror sets, it is important that the mirrors are rigidly connected, so as to fix and maintain the relationship of their planes of incidence. A given set of mirror surfaces and radii will be astigmatism-free only for the particular arrangement of the planes of incidence described herein.

It should also be appreciated that the phrase "mirror set" is used throughout this Specification, including in the claims, to denote a set of any number of mirrors (including a single mirror, or more than one mirror).

Figure 5:
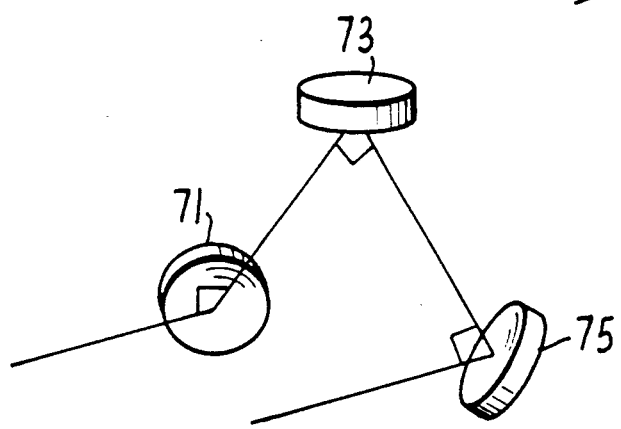
FIG. 5 is a perspective view of corner mirror set including three concave spherical mirrors, of the type employed in a third embodiment of the invention.

In an alternative embodiment shown in FIG. 5, each corner mirror set of the inventive system includes three concave spherical mirrors (mirrors 71, 73, and 73). The mirrors are designed to reflect incident radiation by 180 degrees (with a lateral offset as in the FIG. 3 and FIG. 4 embodiments). If the incident beam has spherical wavefronts, the reflected beam will have spherical wavefronts with a different radius of curvature. Mirror 75 will correct for astigmatism introduced into the beam by reflection from mirrors 71 and 73. We shall denote the radii of curvature of mirrors 71, 73, and 75 respectively as $R_1$, $R_2$, and $R_3$. These radii of curvature should be selected to satisfy the relationship $(R_1)^{-1}+(R_3)^{-1}=(R_2)^{-1}$. If the radii of curvature are so selected, and equal optical power in the tangential and sagittal planes is required, the relationship between the optical power (inverse focal length) of mirrors, 71, 73, and 75 ($P_1$, $P_2$, and $P_3$ respectively) will be $P_1+P_3=P_2$.

In one embodiment, all three of mirrors 71, 73, and 75 are concave spherical mirrors, whose radii of curvature have absolute values 120 m, 60 m, and 120 m respectively. The effective combined focal length (inverse optical power) of such three-mirror corner mirror set would be 14.14 meters. The mirrors in this embodiment should be aligned so that each mirror introduces a 90 degree change in the propagation direction of the beam incident thereon.

In a special case of the FIG. 5 embodiment, one of mirrors 71 and 75 is a flat (planar) mirror (having essentially infinite radius of curvature), and the other two of mirrors 71, 73, and 75 are spherical mirrors. For example, mirror 71 may be flat, and mirrors 73 and 75 will be spherical mirrors having substantially equal radii of curvature (which may be substantially equal to 60 m).

The three mirror embodiment of the inventive corner mirror set (described with reference to FIG. 5) avoids use of a pair of off-axis aspheric mirrors, which are not only more expensive than spherical or planar mirrors but also more difficult to use. However, the three mirror embodiment is inherently more complex and expensive than the two mirror embodiments (each embodiment including a spherical and a cylindrical mirror) described above with reference to FIGS. 3 and 4.

Figure 6:
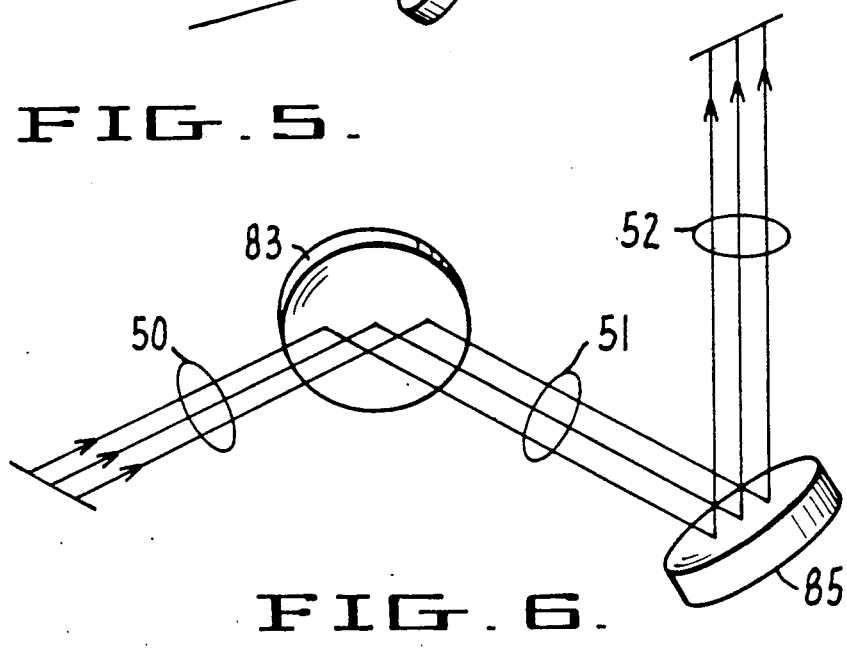
FIG. 6 is a perspective view of a corner mirror set including two concave spherical mirrors.

Yet another alternative embodiment of the inventive corner mirror set is shown in FIG. 6. Concave spherical mirror 83 is oriented to reflect incident radiation beam 50 by 90 degrees and concave spherical mirror 85 is oriented to reflect once-reflected beam 51 by 90 degrees, so that twice reflected beam 52 propagates in a direction offset from, and rotated by 90 degrees with respect to, the incident beam's direction. The angle of incidence of incident beam 50 at mirror 83 is the same as the angle of incidence of once-reflected beam 51 at mirror 85. Where incident beam 50 is a tangential fan of rays as shown (i.e., a fan of rays oriented parallel to the incidence plane), reflected beam 51 will be a sagittal fan (i.e., a fan of rays oriented perpendicular to the incidence plane) at mirror 85. The fact that the incidence planes at the two mirrors are perpendicular to each other is likely to be a design disadvantage for laser intra-cavity applications. For extra-cavity applications, however, this design feature will typically not be a problem.

Another class of embodiments will next be described with reference to FIG. 7. Laser beam delivery system 190 of FIG. 7 includes optical resonator 124 mounted on an adjustable mechanical positioning assembly 192. An output laser beam 28 emerges from resonator 124, and is directed by a set of tubes (including tubes 142, 144, 149, and 154) and mirror joints (including joints 146, 150, and 152) to focusing lens 194. The laser beam then propagates from lens 194 to a target area 196. Target area 196 may define a region on a workpiece surface to be welded, cut, or scribed.

Figure 7:
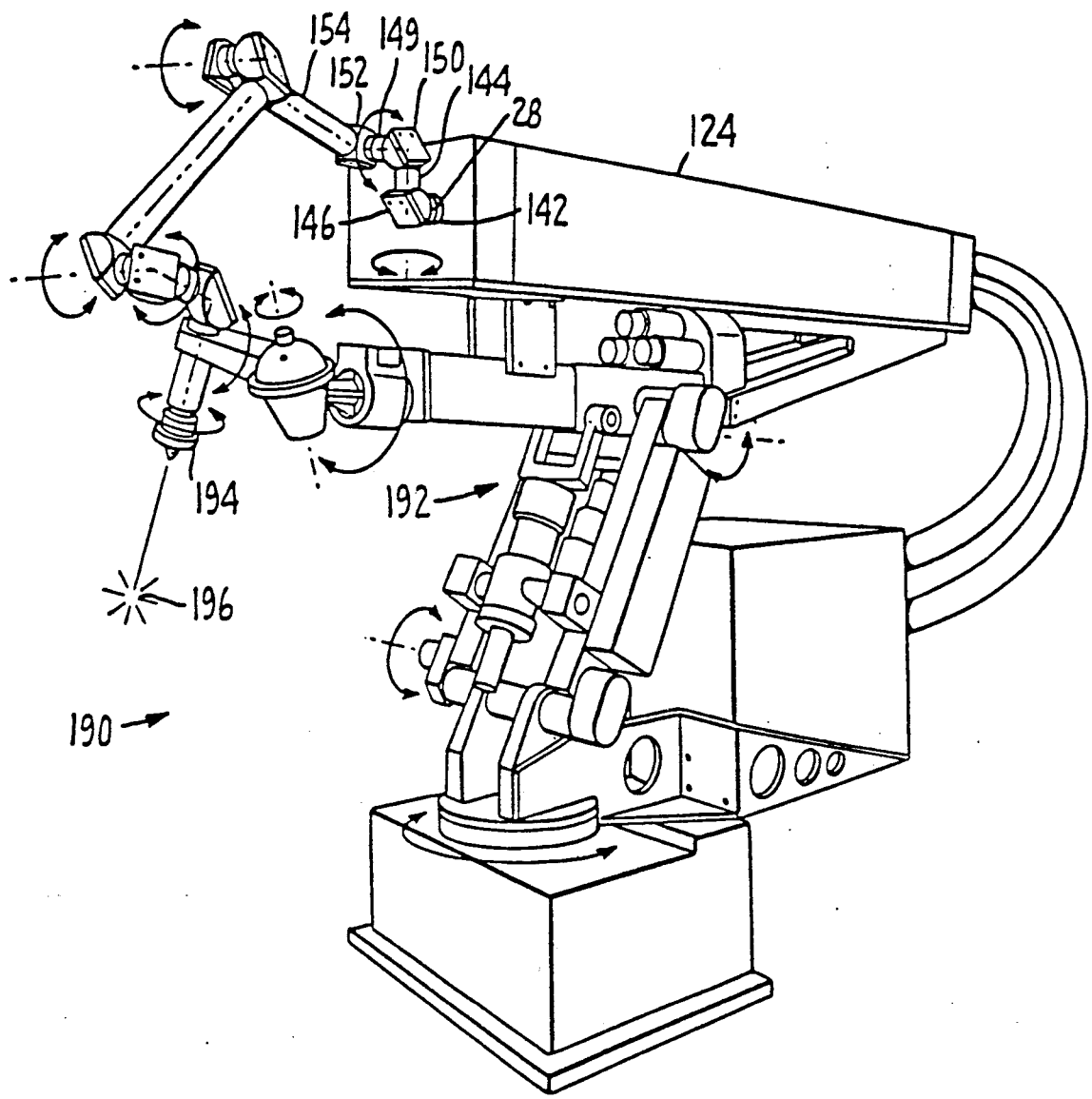
FIG. 7 is a perspective view of a laser beam delivery system, representing an alternative embodiment of the invention.

It is within the scope of the invention to include one or more of the inventive corner mirror sets in the portion of a high power laser beam optical path outside an optical resonator cavity (i.e., outside resonator 124 of the FIG. 7 system). Thus in FIG. 7, each pair of adjacent rigid mirror joints (such as the pair comprising joint 146 and joint 150) may include a corner mirror assembly of the type described with reference to FIGS. 6. In such an "extra-cavity" embodiment of the invention, as in the intra-cavity embodiments described above, use of the inventive corner mirror sets permits the construction of an all-reflective optical system. Such all-reflective optical systems are preferred for high power applications, in which use of refractive elements (transmissive lenses) is either impractical or impossible because of thermally induced distortion or damage. For example, if spherical mirrors 83 and 85 are included in mirror joints 146 and 150 respectively, it will be possible to provide substantially astigmatism-free focusing power to control the beam diameter as it travels through the beam delivery system without having to use any transmissive lenses.

Other extra-cavity embodiments of the invention include high power beam expanding telescopes including one or more of the inventive corner mirror sets. In the extra-cavity embodiments of the invention, it is contemplated that the optical resonator cavity may enclose any lasing medium (including any gaseous lasing medium or any solid lasing medium), and that at least one of the inventive corner mirror sets be positioned outside the cavity. It is also contemplated that at least one of the inventive corner mirror sets may be positioned inside the cavity and that at least one other of the inventive corner mirror sets may be positioned outside the cavity.

Typically, each extra-cavity embodiment of the invention will include only a single mirror set. However, for the same reason as in the intra-cavity embodiments described above, in some extra-cavity embodiments (particularly where the external beam path is extremely long, i.e., one or more kilometers), two or more corner mirror sets may be positioned with appropriate spacing along the external beam path. The purpose of employing two or more such extra-cavity mirror sets is to provide sufficient periodic refocusing to maintain substantially constant laser beam diameter throughout the length of the external beam path, and to eliminate transmissive focusing elements from the external beam path.

In the FIG. 7 example, one or more pairs of rigid mirror joints between resonator 124 and target 196 may embody one of the inventive focusing mirror sets to control the beam diameter as it propagates toward the final lens 194. Such control of beam diameter is important in order to establish a desired beam diameter at the final lens, or to establish a desired beam diameter at other critical aperture(s) in the beam delivery system, or both. This becomes especially important where the beam delivery path length is long (i.e., 10 to 20 meters or more).

In an embodiment including two mirror sets disposed at opposite ends of an optical cavity plasma tube, the mirror sets should maintain the beam diameter substantially constant along a sufficiently long path portion between the two mirror sets so that constant diameter tubing (in contrast with tubing having differing diameter portions or sections) may be employed to enclose the beam between the two mirror sets without significant loss of efficiency or maximum output beam power. In an embodiment including a single mirror set, the mirror set should maintain the beam diameter substantially constant along a sufficiently long path portion so that all mirrors in the set may be mounted on constant diameter tubing enclosing the beam (in contrast with tubing having differing diameter portions or sections), without significant loss of efficiency or maximum output beam power.

Various modifications and alterations in the structure of the specific embodiments described above will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A laser system producing a high power laser beam, and including:
    an optical resonator cavity enclosing a lasing medium through which the laser beam propagates, wherein the laser beam propagates along a first path within the cavity, and wherein the laser then emerges from the cavity and propagates along a second path outside the cavity; and
    a first mirror set positioned along a first portion of the first path within the cavity, said first set having effective focal length providing sufficient focal power to compensate for distributed thermally-induced lensing in the lasing medium and to maintain substantially constant laser beam diameter along a region of the first path adjacent said first set.

2. The system of claim 1, wherein each mirror in the first set is shaped and oriented so that the first set is substantially astigmatism-free.

3. The system of claim 2, wherein the first set includes a spherical mirror and a cylindrical mirror.

4. The system of claim 2, wherein the first set includes three mirrors.

5. The system of claim 4, wherein two of the three mirrors are spherical mirrors, and the remaining one of the mirrors is a planar mirror.

6. The system of claim 1, wherein the lasing medium is gaseous.

7. A laser system producing a high power laser beam, and including:
    an optical resonator cavity enclosing a lasing medium through which the laser beam propagates, wherein the laser beam propagates along a first path within the optical resonator cavity, and wherein the laser beam then emerges from the cavity and propagates along a second path outside the cavity; and
    a first mirror set positioned along a first portion of the first path within the cavity, said first set having an effective focal length providing substantially astigmatism-free focusing power sufficient to maintain substantially constant laser beam diameter along a region of the first path adjacent said first set.

8. A laser system producing a high power laser beam, including:
    an optical resonator cavity including a set of channels for enclosing a gaseous lasing medium; and
    a first set of mirrors positioned between a first and a second of the optical resonator cavity channels, for directing the laser beam to propagate from the first channel to the second channel, said first set of mirrors having a first effective focal length providing sufficient focal power to compensate for distributed thermally-induced lensing in the lasing medium and to maintain substantially constant laser beam diameter within the first channel and the second channel.

9. The system of claim 8, also including a mirror housing connecting the first channel to the second channel, wherein the first set of mirrors is mounted within the housing.

10. The system of claim 8, wherein the first channel and the second channel have substantially equal diameters.

11. The system of claim 8, wherein the lasing medium includes carbon dioxide gas.

12. The system of claim 8, wherein the mirrors in the first set are shaped and oriented so as to induce substantially no astigmatism in the beam reflected from them.

13. The system of claim 8, wherein the optical resonator cavity also includes a third channel, and also including:
    a second set of mirrors positioned between the second channel and the third channel, for directing the laser beam to propagate from the second channel to the third channel, said second set of mirrors having a second effective focal length equal to or different from the first effective focal length and providing sufficient focal power to maintain substantially constant laser beam diameter within the second channel and the third channel.

14. The system of claim 13, wherein the mirrors in the first set and the second set are shaped and oriented so as to induce substantially no astigmatism in the beam reflected from them.

15. A laser system producing a high power laser beam, including:

an optical resonator cavity enclosing a lasing medium, wherein the high power laser beam emerges from the cavity and propagates along an external beam path outside the cavity; and a first mirror set positioned along the external beam path, wherein each mirror in the first set is shaped and oriented so that the first set induces substantially no astigmatism in the beam, and wherein said first set has an effective focal length selected to provide a desired beam diameter at one or more critical locations along the beam path.

16. The system of claim 15, also including a set of substantially equal diameter channels which enclose the beam along the external beam path.

17. The system of claim 15, wherein the first mirror set comprises a first spherical mirror and a second spherical mirror, wherein the first spherical mirror and the second spherical mirror have substantially perpendicular incidence planes.

18. The system of claim 15, wherein the first mirror set comprises a concave spherical mirror and a concave cylindrical mirror.

19. The system of claim 15, wherein the first mirror set comprises a concave spherical mirror and a convex cylindrical mirror.

* * * * *